United States Patent [19]

Corteggiani

[11] Patent Number: 4,897,032
[45] Date of Patent: Jan. 30, 1990

[54] APPARATUS FOR MAKING A CLOSURE DEVICE COMPRISING A HINGED CAP FOR A CONTAINER

[75] Inventor: Pierre Corteggiani, Seyssins, France

[73] Assignee: Le Moulage Automatique, Chateau Thierry, France

[21] Appl. No.: 278,131

[22] Filed: Nov. 30, 1988

[30] Foreign Application Priority Data

Dec. 4, 1987 [FR] France ................................ 87 16883

[51] Int. Cl.⁴ .............................................. B29C 33/00
[52] U.S. Cl. ..................................... 425/556; 249/63; 249/66.1; 249/122; 249/149; 425/577; 425/412; 425/441; 425/450.1
[58] Field of Search ................ 249/63, 66.1, 122, 142, 249/144, 149, 176; 425/450.1, 554, 556, 451.9, 412, 426, 577, 441

[56] References Cited

U.S. PATENT DOCUMENTS

| 3,344,942 | 10/1967 | Hedgewick | 425/556 |
| 3,499,588 | 3/1970 | Bartilson et al. | 222/556 |
| 3,675,812 | 7/1972 | Foster | 222/556 |
| 4,361,250 | 11/1982 | Foster | 222/451 |
| 4,547,332 | 10/1985 | Drozd | 264/318 |
| 4,610,621 | 9/1986 | Taber | 425/577 |
| 4,741,088 | 5/1988 | Ramella | 264/318 |
| 4,812,116 | 3/1989 | Abrams | 425/547 |

FOREIGN PATENT DOCUMENTS 201655 11/1986 European Pat. Off. .
1258979 1/1972 United Kingdom .
1360091 7/1974 United Kingdom .

Primary Examiner—Willard Hoag
Attorney, Agent, or Firm—Pollock, VandeSande & Priddy

[57] ABSTRACT

The closure device provided for a container ending in a neck is of the type comprising a cap (1) with a lid (5) which is hinged thereon.

With a view to facilitating the molding operation of the cap and the lid thereof in one single piece, the hinge (6) is a double hinge having a few millimeter width.

1 Claim, 3 Drawing Sheets

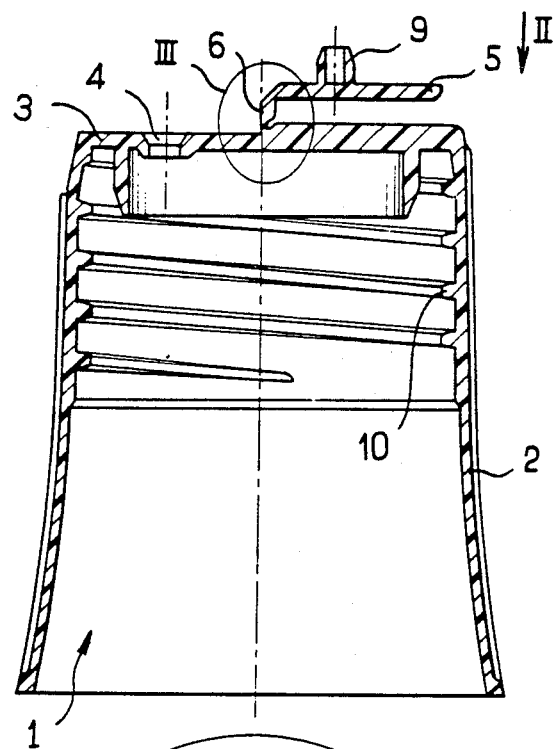
FIG_1
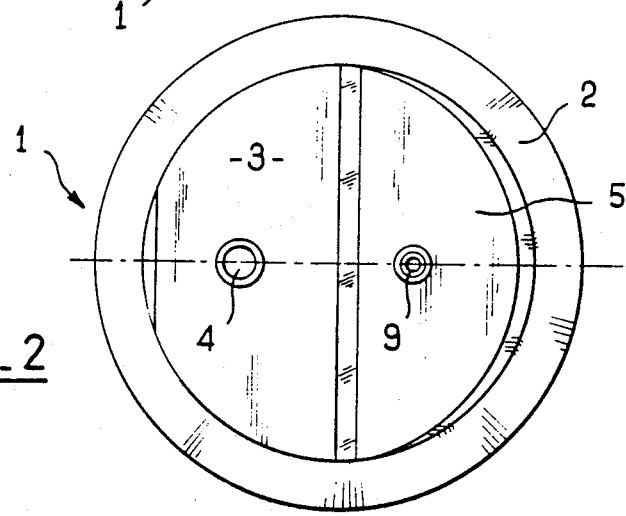
FIG_2
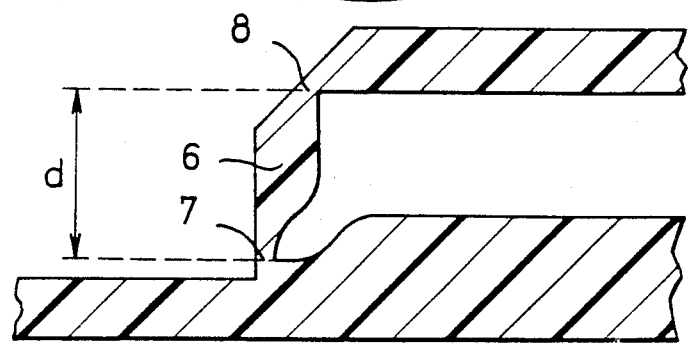
FIG_3

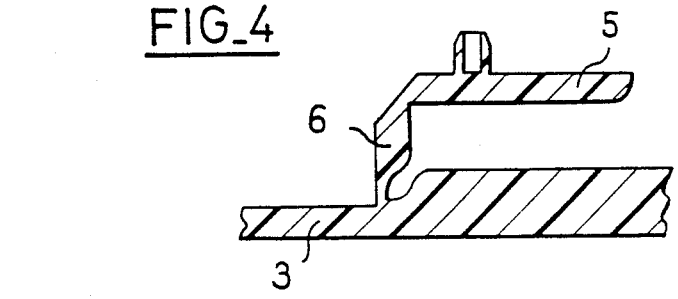
FIG_4
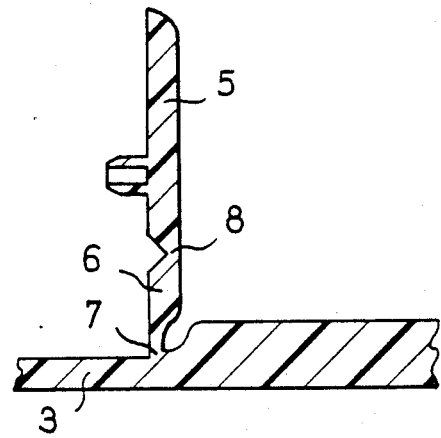
FIG_5
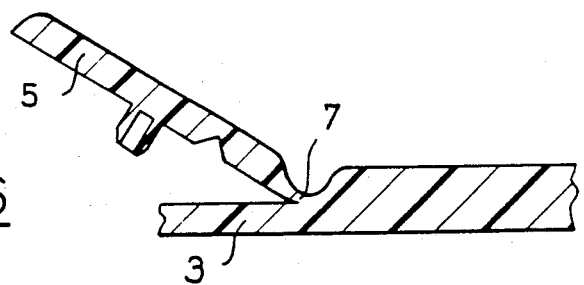
FIG_6
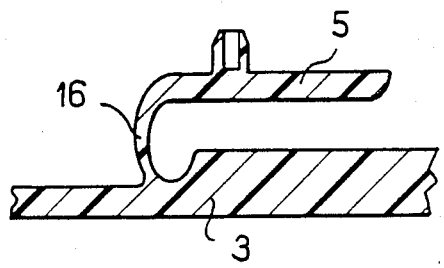
FIG_10

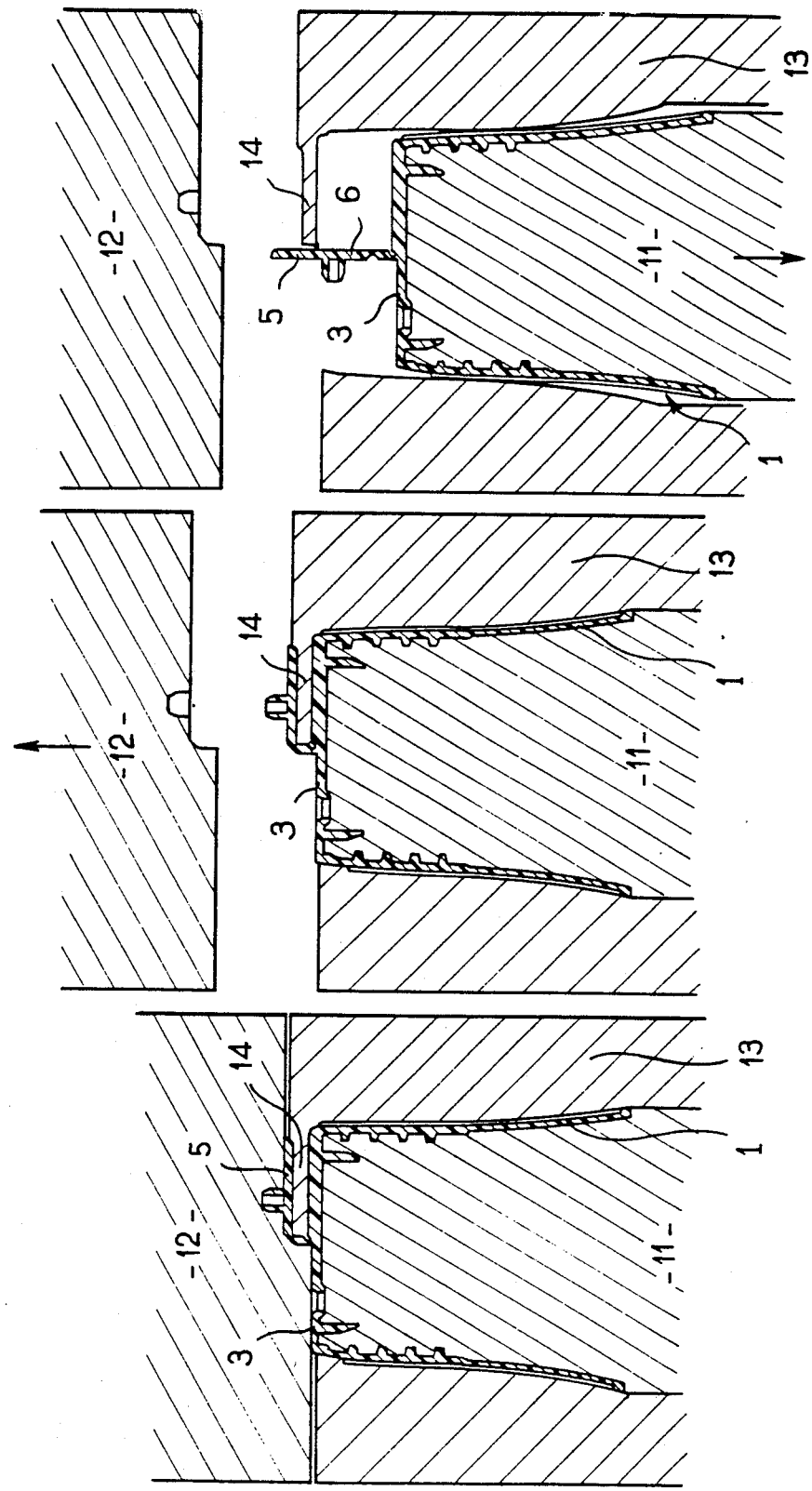

APPARATUS FOR MAKING A CLOSURE DEVICE COMPRISING A HINGED CAP FOR A CONTAINER

The invention relates to a closure device for a containing ending in a neck, of the type comprising a cap with a lid which is hinged thereon, enabling at least one pouring orifice formed on the top of the cap to be disengaged when the lid is in an open position and the said orifice to be closed when the lid is in a closed position hinged downward on the cap.

Containers comprising such a device, which have the advantage of facilitating opening and closing operations while eliminating the danger of the stopper getting lost and which also facilitate use of the product stored in the container, are becoming increasingly known. This kind of closure is commonly found in particular among household cleaning products as well as cosmetics, shampoos, etc.

The drawback of this type of closure is its relatively high manufacturing cost due more particularly to the provision of a hinging arrangement on the cap.

In the prior art, devices are known in particular where the cap and the lid are made up of two separate parts which are then assembled one on top of the other. It is obvious that such a design involves a greater number of operations than if the cap and lid assembly is molded as a single piece.

According to other known devices, the cap and the lid are molded as a single piece, the hinging arrangement being provided on the side of the cap. This means that the device takes up more space when the cap is open, which may also be unesthetic; in particular, this generally means that the cap and the lid are molded while flat, with the lid in the open position, thereby resulting in larger dimensions of the mold surface and thus substantially halving the number of parts which can be molded on the same press.

The object of the invention is to overcome the abovementioned drawbacks.

To this end, in the device according to the invention, which is of the general type described at the beginning, so that it can be molded more easily with the cap and lid as a single piece, the hinging arrangement of the lid on the cap comprises a double hinge or an equivalent hinge, the space separating the two axes of the double hinge or the width of the equivalent hinge being of the order of a few millimeters. Advantageously, the double hinge or equivalent hinge is located in the vicinity of the middle part of the cap.

The invention also relates to a mold for molding a cap of the type described above, this mold being characterized in that it comprises essentially three parts, namely:

the first part forming a piston entering substantially inside the body of the cap;

the second part forming a cover-piece covering the cap and its lid while the latter is in an open position, hinged downward so as to lie substantially parallel to the upper surface of the lid;

the third part forming a cylinder or die surrounding externally the cap body and having a bladeshaped lug which is positioned above the upper surface of the cap and below the said lid which is hinged downward.

The invention also relates to a method of molding a cap of the abovementioned type, using a mold of the type described above, wherein according to this method, in order to ensure ejection of the molded part, namely cap plus lid, the cover-piece of the mold is first separated from the remainder of the mold, the cap is then extracted by removing the piston from below, the lid being simultaneously raised by the blade of the die, and the molded piece is then ejected.

The invention and its mode of application will be understood more clearly with the aid of the following description referring to the accompanying drawings which illustrate embodiments by way of example. In these drawings:

FIG. 1 shows a cross section through the center plane of a cap provided with a double-hinged lid according to the invention;

FIG. 2 shows a plan view in the direction of the arrow II of FIG. 1;

FIG. 3 shows, on a larger scale, a detail of the hinging arrangement of the lid on the cap body, this detail being shown inside a circle III in FIG. 1;

FIGS. 4, 5 and 6 show, in diagrammatic form, three successive positions of the lid hinged on the cap body, ranging from the fully open position (FIG. 4) where the lid is hinged downward so that it lies parallel above the cap, to the fully open position where the lid stands upright at 90° relative to the upper surface of the cap (FIG. 5), and the position assumed just before closure (FIG. 6);

FIGS. 7, 8 and 9 show three successive phases of the molding process performed in a mold according to the invention;

FIG. 10 shows a variation of embodiment of the hinge.

With reference to the drawings and, initially, referring to FIGS. 1 to 3, these show a cap denoted in its entirety by 1 comprising essentially a cap body 2 which is fixed onto the neck of a container (not shown) and an upper surface 3 or cap "top" having an orifice 4 for pouring the product stored inside the container. The cap has a lid 5 which is hinged thereon by means of a hinge 6 which, in the example shown, is of the double-hinge type with two hinging axes 7, 8 (FIG. 3). The lid 5 has an obturator 9 which, when hinged downward, closes the orifice 4.

In the example shown in FIG. 1, it has been assumed that the cap was of the type which can be screwed onto the neck of the container by means of a screw thread denoted by 10.

With reference to FIGS. 4, 5 and 6, three intermediate opening positions of the lid 5 have been shown in diagrammatic form.

In FIG. 4, the lid 5 is in the same position as that shown in FIG. 1, the lid being in the fully open position hinged downward so that it lies substantially parallel above the upper surface 3 of the cap.

In FIG. 5, the lid 5 has been raised into a position substantially perpendicular to the upper surface 3 of the cap, the lid 5 having in fact rotated through 90° about the axis 8 of the hinge 6.

In the position shown in FIG. 6, just before the lid 5 has closed, the lid has pivoted about the axis 7 of the hinge.

If such a "double-action" is normally required, it suffices to form the hinge 8 such that it is weaker than the hinge 7, this being evident moreover from the embodiment shown on a larger scale in FIG. 3.

However, it is also possible to provide a reverse arrangement in which the hinge 8 will be stronger than the hinge 7, this being generally preferred in practice.

With reference to FIGS. 7, 8 and 9, the advantages of such a cap designed according to the invention will now be described.

FIG. 7 shows the cap 1 with its lid 5 being molded inside a mold consisting essentially of three parts, namely:

a first part forming a core or piston 11 entering substantially inside the body of the cap 1;

a second part 12 forming a top or cover-piece for closing the mold which covers the cap 1 and its lid 5, acting against the piston 11;

and a third part forming a cylinder or female mold 13 surrounding externally the body of the cap 1 and having a blade-shaped lug 14 which is positioned above the upper surface 3 of the cap and below the lid 5 which is molded in the open position, hinged downward, equivalent to that shown in the preceding FIG. 4. The surface of the blade 14 projecting generally parallel to and spaced from an end of the core 11 and which is adjacent said core defines an external surface of said cap whereas the opposite surface of said blade defines an outer surface of the lid when the lid is closed in said cap. Similarly, the mold part 12 by its abutting surfaces defines a part of end portion of the cap and the portion of said lid which will be an inner surface when the lid is in a closed position in said cap. The mold being thus closed, the body of the cap 1 and its lid 5 are molded in a single operation.

After molding has been performed, the mold is removed as described below.

With reference to FIG. 8, the mold is opened by separating first of all the cover-piece 12 from the remainder of the mold.

Following which, as shown in FIG. 9, it is sufficient to extract the cap body 1 by pulling the piston 11 downwards relative to the cylinder 13 which is assumed to be fixed. During this operation, the lid 5, integral with the body 1 of the cap, must open by rotating above the blade 14, thereby enabling the molded cap with its lid to be removed. At the end of the movement, when the piston 11 has left the cylinder 13, ejection is performed in the conventional manner. In the example shown of a screwed cap, this may be achieved for example by unscrewing the cap from the piston 11.

It will be noted that, as a result of a double hinge 6 being provided, the blade 14 can be given the desired thickness of, for example, a few millimeters and preferably between 2 and 4 mm so as to ensure that the mold is strong and can be easily manufactured. The thickness of the blade 14 will be determined solely by the distance d (FIG. 3) separating the two hinging axes 7 and 8.

It is quite obvious, however, that the principle of the invention is not limited to a double hinge. Any equivalent hinge forming a tongue can be used in place of the double hinge, as shown for example in FIG. 10. In such an embodiment, the tongue 16 will play the same part as the double hinge 6, the width of the tongue 16 being chosen so as to be substantially equal to the above distance d referred to in connection with FIG. 3.

It should also be noted that the invention is not limited to a cap of the screwable type, it being possible for any other kind of cap, for example a "clippable" cap which can be adjusted by force or the like, to be manufactured as well. It will be noted that, in the case of a screwable cap, the cap with an incorporated lid according to the invention can form a metering/dispensing device if the cap is unscrewed and is used with the lid closed.

In the same manner, any suitable shape required can be given to the orifice 4 and the lug 9 cooperating during closure, it being possible for the orifice 4 to be replaced by a pouring orifice, an orifice with a directional delivery nozzle, etc.

In the examples shown, it can be seen that the lid hinging arrangement may advantageously be provided in the vicinity of the middle part of the cap, this generally being preferred, but it also evident that according to the invention this hinging arrangement may be located more or less toward the periphery of the cap, without modifying the general process described.

I claim:

1. A mold for forming an aperture container cap having a hinged lid mold in an open position, comprising:

a core for defining a cap interior and about which a hinged cap can be molded; a female mold having plural relatively movable parts for forming a cap exterior and defining a generally cylindrical mold cavity, one of said movable parts having a blade portion projecting generally parallel to and spaced from an end of said core to define an end portion of the cap therebetween, a surface of said blade portion opposite a second surface thereof next adjacent said core defining a surface of said lid which will be an outer surface when the lid is closed in said cap and a further mold part movable to abut said movable parts to close said mold and in-part defining end portions of said cap and a portion of said lid which will be an inner surface when the lid is in a closed position in said cap, the cap being ejectable from the mold merely by relative axial movement of the mold parts.

* * * * *

UNITED STATES PATENT AND TRADEMARK OFFICE
CERTIFICATE OF CORRECTION

PATENT NO. : 4,897,032

DATED : January 30, 1990

INVENTOR(S) : Pierre Corteggiani

It is certified that error appears in the above-identified patent and that said Letters Patent is hereby corrected as shown below:

Column 1, under the title, insert the heading --FIELD OF THE INVENTION--.

Column 1, bridging lines 6 and 7, change "containing" to --container--.

Column 1, between lines 12 and 13, insert the heading --BACKGROUND OF THE INVENTION--.

Column 1, line 34, change "unesthetic" to --unaesthetic--.

Column 1, between lines 39 and 40, insert the heading --BRIEF DESCRIPTION OF THE INVENTION--.

Column 2, between lines 8 and 9, insert the heading --BRIEF DESCRIPTION OF THE FIGURES--.

Column 2, line 34, before "embodiment" insert --the--.

UNITED STATES PATENT AND TRADEMARK OFFICE
CERTIFICATE OF CORRECTION

PATENT NO. : 4,897,032
DATED : January 30, 1990
INVENTOR(S) : Pierre Corteggiani It is certified that error appears in the above-identified patent and that said Letters Patent is hereby corrected as shown below:

Column 2, between lines 34 and 35, insert the heading

--DETAILED DESCRIPTION OF THE INVENTION--.

Column 3, line 21, change "blade 14" to --blade-shaped lug 14--.

Column 3, line 42, change "blade 14" to --blade-shaped lug 14--.

Column 3, line 51, change "blade 14" to --blade-shaped lug 14--.

Column 4, line 1, change "blade 14" to --blade-shaped lug 14--.

Column 4, line 21, change "lug 9" to --obturator 9--.

Column 4, line 28, after "it" insert --is--.

Column 4, line 34, change "mold" to --molded--.

Signed and Sealed this

Twenty-ninth Day of January, 1991

*Attest:*

HARRY F. MANBECK, JR.

*Attesting Officer*     *Commissioner of Patents and Trademarks*